(12) United States Patent
Pathare et al.

(10) Patent No.: US 11,379,860 B2
(45) Date of Patent: Jul. 5, 2022

(54) SYSTEM FOR CONTROL GROUP OPTIMIZATION TO IDENTIFY OPTIMAL BASELINE ALGORITHM

(71) Applicant: MASTERCARD INTERNATIONAL INCORPORATED, Purchase, NY (US)

(72) Inventors: Ameya Pathare, Washington, DC (US); Brian Pujanauski, Arlington, VA (US); Simon Krauss, Arlington, VA (US); Jenna Kanterman, Washington, DC (US); Cornelius Kaestner, Arlington, VA (US); Christopher Piccoli, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 228 days.

(21) Appl. No.: 15/410,665

(22) Filed: Jan. 19, 2017

(65) Prior Publication Data

US 2018/0204224 A1 Jul. 19, 2018

(51) Int. Cl.
*G06Q 30/00* (2012.01)
*G06Q 30/02* (2012.01)

(52) U.S. Cl.
CPC ..... *G06Q 30/0201* (2013.01); *G06Q 30/0242* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,974,412 | A | * | 10/1999 | Hazlehurst | G06F 16/3332 |
| 8,417,715 | B1 | * | 4/2013 | Bruckhaus | G06Q 30/0202 |
| | | | | | 707/758 |
| 9,280,618 | B1 | * | 3/2016 | Bruce | G06F 30/20 |
| 10,127,255 | B1 | * | 11/2018 | Campbell | G06F 16/2465 |
| 10,127,575 | B1 | * | 11/2018 | Weidman | G06Q 30/0211 |
| 2002/0059196 | A1 | * | 5/2002 | I'Anson | G06Q 30/06 |
| 2008/0269947 | A1 | * | 10/2008 | Beane | G06Q 30/0607 |
| | | | | | 700/237 |
| 2012/0131019 | A1 | * | 5/2012 | Sugiura | G06F 3/04842 |
| | | | | | 707/748 |

(Continued)

*Primary Examiner* — Hafiz A Kassim
*Assistant Examiner* — Matheus Ribeiro Stivaletti
(74) *Attorney, Agent, or Firm* — Foley & Lardner LLP

(57) ABSTRACT

Systems and methods for dynamically determining an optimal baseline algorithm for calculating lift values are disclosed. The system receives data associated with a control strategy, and then randomly selects a control location, a time period, and an item that may not be associated with the control strategy but meets the one or more criteria of the control strategy such as relevance and sales volume. Using the randomly selected inputs and a plurality of null baselines values determined by a plurality of null baseline algorithms, the system iteratively calculates a plurality of null lift values for each of the applied plurality of null baselines values to determine a likelihood for a false positive lift for each of the applied plurality of null baselines values. An optimal baseline algorithm is selected from the plurality of null baselines algorithms based on their corresponding likelihood of false positive lifts.

14 Claims, 4 Drawing Sheets

(56) References Cited

U.S. PATENT DOCUMENTS

| | | | |
|---|---|---|---|
| 2013/0246146 A1* | 9/2013 | Fischer | G06Q 30/0222 705/14.23 |
| 2013/0263020 A1* | 10/2013 | Heiferman | H04L 12/1818 715/753 |
| 2015/0006867 A1* | 1/2015 | Gschwind | G06F 9/30145 712/229 |
| 2015/0149357 A1* | 5/2015 | Ioannidis | G06Q 20/3224 705/44 |
| 2015/0324919 A1* | 11/2015 | Riggs | G06F 16/22 705/36 R |
| 2016/0012457 A1* | 1/2016 | Unser | G06Q 10/063 705/7.29 |
| 2016/0371719 A1* | 12/2016 | Moran | G06Q 30/0244 |
| 2017/0004518 A1* | 1/2017 | Moreau, Jr. | G06Q 30/0204 |
| 2017/0013323 A1* | 1/2017 | Whitney | G06Q 30/0273 |
| 2017/0206592 A1* | 7/2017 | Chen | G06Q 10/06393 |
| 2017/0213242 A1* | 7/2017 | Sundaram | G06Q 30/0242 |
| 2018/0150899 A1* | 5/2018 | Waldron | G01S 19/13 |
| 2018/0174088 A1* | 6/2018 | Brown | G06N 20/00 |

\* cited by examiner

SYSTEM FOR CONTROL GROUP OPTIMIZATION TO IDENTIFY OPTIMAL BASELINE ALGORITHM

TECHNICAL FIELD

This application relates generally to dynamically determining an optimal baseline algorithm from a list of plurality of baseline algorithms by utilizing null simulations.

BACKGROUND

In the product and service industries, businesses often execute a number of promotional activities, such as coupons, temporary price reductions, etc., to help increase sales volume and customer loyalty. Businesses may spend millions of dollars annually on promotional activity and advertising, and then the businesses typically evaluate the financial success of specific business strategies and practices, and rely on algorithms that recognize patterns. For example, the number of grey trousers sold in the month of October over the past three months or years can be used to predict the number of grey trousers that will sell in the following month of October. These models are known as baselines and are relied upon by the businesses for strategic planning.

Businesses may also employ conventional tools and systems to measure the effectiveness of the promotional activities. In one example, the businesses may analyze the effectiveness of a promotional activity by comparing the sales data for a time-period surrounding the promotion with the historical baselines sales data. In another example, a business merchant may send promotional materials to a subset of its customers (e.g., test group) who are identified as targets of the promotion and compare the performance (e.g., sales) of that subset to a sample of comparable customers who are not part of the promotion (e.g., control group). The effectiveness of the campaign may be based on the comparison between the performance of the test group measured against the performance of the control group.

It has been observed that the conclusions drawn from merely evaluating the differences between promotional sales data and baseline sales data are typically misleading and potentially unsuccessful. Furthermore, accurate models have not been available for evaluating the business chain-wide promotions, and therefore understanding the true incremental impact of the business chain-wide promotions is challenging and common problem. For instance, the conventional tools and systems employing control groups are not effective as there is no best control group for a business chain-wide promotion to help evaluate a sales lift that occurred in a certain period of time. Also, salespersons generally do not have access to a planning system that allows them to compare multiple promotional scenarios, or that allows businesses to understand the impact on sales and profits of the promotions being considered.

Typically, many factors contribute to sales, however, such factors are often overlooked during the creation of a baseline. For example, a few common algorithms used traditionally by the retailers to create a baseline for a given promotion are to consider last year's sales, sales prior to the promotion, or the prior weeks' category share by taking the share of a category in prior weeks, and then determine if the share of the sales has increased. Such conventional algorithms for creation of a baseline are ineffective as the true incremental impact of the business chain-wide promotions is not evaluated correctly because many factors are ignored during creation of baselines. Therefore, the baselines are essentially inaccurate when used to analyze promotional activities, and the businesses that rely on inaccurate baselines may excessively lower prices, ignore specific consumer groups, overlook product characteristics and eventually misidentify losses as profits.

SUMMARY

There is a need to develop a system to accurately measure business chain-wide promotions which will be a valuable addition to an analytic capability of business organizations that run large scale promotions. Disclosed herein are systems and methods capable of addressing the above-described shortcomings and may also provide any number of additional or alternative benefits and advantages. For example, the methods and systems in the embodiments described herein evaluate the effectiveness of different types of product promotions in the businesses by calculating a sales lift attributable to the promotions. One feature of the methods and systems in the embodiments is the determination of an optimal baseline algorithm from a plurality of baseline algorithms, against which promotion sales are compared and based on which the sales lift is determined. The systems and methods disclosed herein may comprise dynamically determining optimal baseline algorithm from the plurality of baseline algorithms by utilizing null simulations. The systems and methods disclosed herein executes one or more null simulations that correspond to an identification of null events where nothing has happened (for example, no promotion was offered), and consequently the systems and methods disclosed herein applies one or more null baseline values determined by one or more baseline algorithms to a null event to determine a performance change (e.g., sales lift) for the null event(s).

In one embodiment, a computer-implemented method comprises receiving, by an analytics server, from a database an input from a user interface comprising data associated with a control location. The data associated with the control location comprises data associated with a control strategy comprising a pre-period, a post-period, and an item associated with the control strategy. The computer-implemented method further comprises randomly selecting, by the analytics server, a null test location where the null test location is not based on the control location. The computer-implemented method further comprises randomly selecting, by the analytics server, a null time period where the null time period is not based on the pre-period or the post-period. The computer-implemented method further comprises generating a first instruction, by the analytics server, to the database to receive data associated with the item. The computer-implemented method further comprises upon transmitting the first instruction, by the analytics server, receiving from the database, data associated with the item. The computer-implemented method further comprises randomly selecting, by the analytics server, a null item not associated with the item. The computer-implemented method further comprises iteratively calculating, by the analytics server, a plurality of null lift values using the randomly selected null time period, the randomly selected null test location, the randomly selected null item, and a plurality of null baselines determined based on a plurality of null baseline algorithms. The computer-implemented method further comprises ranking, by the analytics server, the plurality of null baselines algorithms corresponding to the plurality of null lift values where the rank associated with each of the plurality of null baselines algorithms is adjusted upward when the corresponding null lift value is closer to 0. The computer-implemented method further comprises calculating, by the analytics server, an optimal control strategy lift value based on the pre-period, the post-period, the item associated with the control strategy, and the highest ranked null baseline algorithm.

In another embodiment, a computer system comprises an analytics server. The analytics server comprises one or more processors configured to receive from a database an input from an user interface comprising data associated with a control location. The data associated with the control location comprises data associated with a control strategy comprising a pre-period, a post-period, and an item associated with the control strategy. The analytics server is further configured to randomly select a null test location where the null test location is not based on the control location. The analytics server is further configured to randomly select a null time period where the null time period is not based on the pre-period or the post-period. The analytics server is further configured to generate a first instruction to the database to receive data associated with the item. The analytics server is further configured to, upon transmitting the first instruction, receive from the database, data associated with the item. The analytics server is further configured to randomly select a null item not associated with the item. The analytics server is further configured to iteratively calculate a plurality of null lift values using the randomly selected null time period, the randomly selected null test location, the randomly selected null item, and a plurality of null baselines determined based on a plurality of null baseline algorithms. The analytics server is further configured to rank the plurality of null baselines algorithms corresponding to the plurality of null lift values where the rank associated with each of the plurality of null baselines algorithms is adjusted upward when the corresponding null lift value is closer to 0. The analytics server is further configured to calculate an optimal control strategy lift value based on the pre-period, the post-period, the item associated with the control strategy, and the highest ranked null baseline algorithm.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
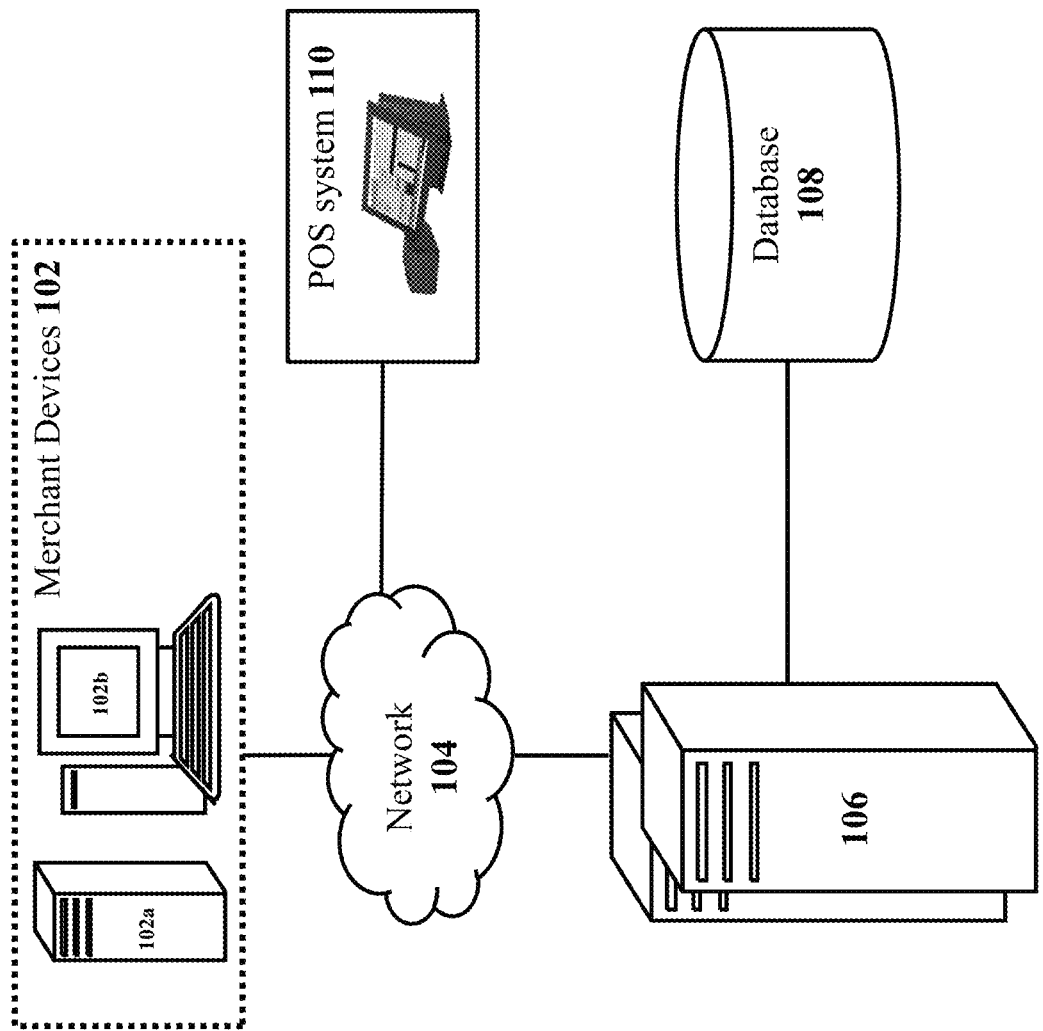
FIG. 1 shows components of an exemplary system to determine an optimal baseline algorithm for calculating sales lift, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 shows components of an exemplary system 100 to determine an optimal baseline algorithm for calculating sales lift, according to an exemplary embodiment. In an embodiment, the lift or sales lift corresponds to an increase in the volume of sales caused by a promotion. For example, a price reduction of 30% during a given period (e.g., one month) might result in a 60% increase in sales during that one month period. The promotion may correspond to an action taken to increase sales of an item and/or a product of a business merchant during a time period in which the promotion is offered. The examples of promotion types may include but not limited to rewards, discounts, and coupons.

The exemplary system 100 comprises merchant devices 102, a network 104, one or more analytics servers 106, and database 108. The merchant devices 102 are connected to the analytics server 106 via the network 104. The merchant devices 102 may include client computers 102a and 102b, and one or more merchant point-of-sale (POS) systems 110.

The network 104 refers to a medium that connects various merchant devices 102 and the database 108 of the system 100. Examples of the network 104 include, but are not limited to, private or public LAN, WLAN, MAN, WAN, and the Internet. The network 104 can include both wired and wireless communications according to one or more standards and/or via one or more transport mediums. The communication over the network 104 may be performed in accordance with various communication protocols such as Transmission Control Protocol and Internet Protocol (TCP/IP), User Datagram Protocol (UDP), and IEEE communication protocols. In one example, the network 104 includes wireless communications according to Bluetooth specification sets, or another wireless communication protocol. The network 104 can also include communications over a cellular network, including, e.g., a GSM (Global System for Mobile Communications), CDMA (Code Division Multiple Access), or EDGE (Enhanced Data for Global Evolution) network.

The merchant devices 102 may be any portable or non-portable devices such as computing devices. The computing device refers to a computer with a processor/microcontroller and/or any other electronic component that performs one or more operations according to one or more programming instructions. The examples of the computing device include, but are not limited to, a desktop computer, a laptop computer, a personal digital assistant (PDA), a tablet computer, and the like. The merchant devices 102 are capable of communicating with the analytics server 106 through the network 104 using wired or wireless communication capabilities.

The merchant devices 102 may include one or more input/output devices configured to allow user interaction with one or more programs configured to communicate with the analytics server 106 to perform promotion evaluation for the businesses. In one example, the merchant devices 102 include computers from which users can access and interact with the analytics server 106 configured to perform promotion evaluation. In another example, the merchant devices 102 may run a web browser that accesses and presents a web application executed by the analytics server 106 or another device, and allows a user to generate a report including sales data for one or more items sold by the business merchant. In yet another example, the merchant devices 102 execute an application outside of a web browser, for example, an operating system specific application like a Microsoft Windows application or Apple iOS application that accesses and presents information processed to the analytics server 106 that may perform promotion analysis.

The merchant devices 102 may further include Point-of-Sale (POS) systems 110 in the system 100 and may be employed by business merchants as a means for conducting sales transactions. The POS systems 110 may be electronic devices, or collections of electronic devices, configured to generate transaction data when a transaction is executed. The non-limiting examples of the POS systems 110, or components of the POS systems 110, may include cash registers, barcode scanners, magnetic stripe card readers, EMV chip card readers, tablet computers, laptop computers, and the like.

In an embodiment, any data transmitted over the network 104, for example, from the merchant devices 102 to the database 108 may be formatted in accordance with a variety of different communications protocols. For example, all or a portion of the network 104 can be a packet-based, Internet Protocol (IP) network that communicates data from the merchant devices 102 to the database 108 in Transmission Control Protocol/Internet Protocol (TCP/IP) packets. In one example, the transaction data generated by the POS systems 110 may be generated, or otherwise formatted, as sales data in accordance with a formatting specification or protocol expected by the analytics server 106. Additionally, the POS systems 110 may generate or otherwise format the sales data as entity transaction records, which may be stored into the business merchant entity records of the database 108.

In operation, the POS systems 110 receives and processes sales data associated with customer sales transactions of the business merchant at various locations of the business merchant. The analytics server 106 can periodically retrieve raw POS sales data from the POS systems 110, and can store the data, or process and then store the data in the database 108. In one example, the analytics server 106 can generate an instruction, and upon transmitting said instruction to the database 108, receive raw POS sales data for a pre-period and a post-period for a given item from one or more stores in a number of different geographical locations from the POS systems, and can store the data or process and then store the data in the database 108 for a pre-period and a post-period of the promotional time-period. In another example, the POS systems are configured to periodically push the sales data over the network 104 to the analytics server 106 and/or the database 108.

The database 108 store sales data associated with sales of items of the business merchant(s). The sales data may include individual data records, where each data record may include data related to past actual sales value for the each item sold by the business merchant at a number of locations, for example, a number of stores in a number of different geographical locations. Each data record may be categorized based on sale of an item during a particular time period in one or more stores, or category of items sold in one or more stores. It is to be noted that the sales data may be stored in data records in any number of combinations without moving out from the scope of the disclosed embodiments. In one example, a first data record may include data related to number of first items sold during a pre-defined period of time (pre-promotion period, post-promotion period, or promotional period) at a first location, and a second data record may include data related to number of first items sold during a pre-defined period at a second location. In another example, a first data record may include data related to number of all items sold in a first category during a pre-defined period of time (pre-promotion period, post-promotion period, or promotional period) at a first location, and a second data record may include data related to number of all items sold in a first category during a pre-defined period at a second location.

The database 108 may be hosted on one or more computing devices comprising non-transitory machine-readable storage media capable of receiving, storing, updating, and/or querying business merchant sales records of the database 108 containing the sales data. The database 108 may be a logical construct of data files that are stored in non-transitory machine-readable storage media, such as a hard disk or computer memory, controlled by software modules of a database program (for example, SQL, Oracle®, IBM®), and a related database management system (DBMS) that executes the code modules (for example, SQL scripts) for various data queries and other management functions. The database 108 may be hosted on any computing devices comprising storage media capable of storing the sales data received from the POS systems 110, and a processor, or in communication with a processor, capable of executing the various commands of the database management system (DBMS). The non-limiting examples of computing hardware that may host the database 108 may include a server computer, a desktop computer, a laptop, or the like.

In operation, the analytics server 106 may generate an instruction configured to receive sales data (for example, sales data records) and transmit said instruction to the database 108. Consequently, the database 108 may transmit merchant sales data records to the analytics server 106 in order to determine the effectiveness of a promotion offered by a business merchant. The business merchant sales data records may be exclusive information belonging to the business merchant, and is securely transmitted to the analytics server 106 using a secure data transfer and storage apparatus.

The analytics server 106 may execute one or more software modules to do promotion evaluation for the business merchants. The analytics server 106 may perform various analytics on the sales data records stored in the database 108, and may be further employed to calculate the sales lift for a product of the business merchant that is attributable to a sales promotion. The analytics server 106 can be any of several different types of network devices. The non-limiting examples of the analytics server 106 include a desktop computer, a laptop computer, a personal digital assistant (PDA), a tablet computer, a data processing appliance, web analytics server, specialized media analytics server, or another type of network device. The analytics server 106 may be implemented in hardware, software, or a combination of both, and can include one or more functional modules configured to execute various functions attributed to the analytics server 106. Additionally, although example system FIG. 1 includes one analytics server 106, other examples include a number of collocated or distributed analytics servers configured to process sales and other types of data associated with products and other items sold by the business merchant and stored in the database 108 individually or in cooperation with one another.

Although the database 108 and the analytics server 106 are illustrated as separate components in the system 100 of FIG. 1, in other examples the components are combined or each is distributed amongst more than one device. In one example, the analytics server 106 stores the database 108 and control the database 108 to periodically retrieve sales data from POS system 110 over the network 104. In another example, the database 108 and/or POS system 110 are distributed among a number of separate devices, e.g., a number of database analytics servers, and the analytics server 106 includes a number of co-located or distributed analytics servers configured to operate and/or in cooperation with one another and with the various devices comprising the database 108 and/or POS system 110.

Regardless of the particular configuration of system 100 or other example systems, the system 100 may be employed to calculate the lift (for example, sales lift) for a product and/or an item of the business merchant that is attributable to a sales promotion. In one embodiment, the analytics server 106 may retrieve from the POS system 110 or the POS system 110 pushes actual sales transaction data to the analytics server 106 over the network 104. The sales transaction data may be received by the analytics server 106 periodically and stored in the database 108 for different periods of time, e.g., in blocks of one or more days, weeks, months, or years. The analytics server 106 may categorize the sales transaction data and store the sales transaction data into one or more data records which are then stored into the database 108. The analytics server 106 retrieves the sales data records for the one or more products sold by the business merchant in order to analyze the sales data stored on the sales data records to calculate the sales lift for a product or products that is attributable to one or more sales promotions associated with the product(s).

In some embodiments, the merchant devices 102 may send a request to the analytics server 106 to analyze various forms of sales data of one or more items. For example, the analytics server 106 may evaluate sales data for a number of items (or products) that belong to a same or a different product category for one or more time periods, for example, one or more weeks, one or more months, or one or more years. The analytics server 106 may organize the items sold by the merchant into categories of items. The category may refer to a set of related items that are grouped together for consolidation of results. Depending on how the items are grouped together, the analytics server 106 may categorize the sales data under a broader category or a narrower category. In one example, the item category can be a group of a number of items that share one or more attributes or are otherwise related to one another. For instance, the analytics server 106 may group shirts, blazers, and suits into an item category of formal wear. In another example, the analytics server 106 may group t-shirts, jackets, and skirts into an item category of apparel. The item categories generated by the analytics server 106 may not essentially include different types of items that share a similar utility. For instance, item categories include different versions of the same type of item. In one such example, the analytics server 106 organizes different brands of shirts into a shirts category.

The analytics server 106 may retrieve or send a request to retrieve sales data from the appropriate data records stored on the database 108 for a plurality of items in an item category over a period of time. In another embodiment, the analytics server 106 may query the database 108 to obtain sales data from the appropriate data records stored on the database 108 for a plurality of items in an item category over a period of time. The database 108 may store sales data records generated and stored by the merchant devices 102 and/or the analytics server 106, and may be hosted on any number of computing devices comprising a non-transitory machine-readable storage medium capable of storing data records received from the merchant devices 102 or other computing devices such as POS systems. The database 108 may include a processor capable of executing various tasks according to instructions or requests received from the analytics server 106 such as requests to obtain sales data from the sales data records for one or more items at one or more locations over a period of time.

For example, the analytics server 106 may send a request to the database 108 and obtain from the database 108 one or more sales data records associated with a control location. The control location may be any given location in one or more locations of a business merchant. In one embodiment, the control location may be a single location (or a store of a business merchant). In another embodiment, the control location may be a plurality of locations (or a plurality of stores of a business merchant) in a single city, state, or country. The data in the one or more sales data records associated with the control location may include data associated with a control strategy including a pre-period, a post-period, and an item associated with the control strategy. For example, the analytics server 106 may obtain sales data from the one or more sales data records stored on the database 108 for a given sale item (e.g., a shirt) at a control location (for example, Boston store) for a one month period before the promotional offer is provided on the given shirt (pre-period), and for a one month period during the promotional offer is provided on the given shirt (post-period). In another instance, the analytics server 106 may obtain sales data from the one or more sales data records stored on the database 108 for a plurality of sale items (e.g., a plurality of brands of shirts) at one or more control locations (e.g., Boston and/or New York) for a one month time period before (pre-period) and one month after (post-period) the sales period. In an alternate embodiment, the pre-period and the post-period for which the sales data is retrieved by the analytics server 106 may not include any promotion.

The analytics server 106 may further generate an instruction to the database 108 to receive data associated with the item. Upon transmitting the instruction to the database 108, the analytics server 106 receive from the database 108, data associated with the item from the appropriate one or more sales data records. The data associated with the sales item may include a category associated with the item. The data associated with the sales item may further include a sales volume and/or a sales amount associated with the item for the control location.

The analytics server 106 may calculate a control strategy lift value based on the pre-period, the post-period, the item associated with the control strategy, and a control strategy baseline. The control strategy baseline corresponds to a highest ranked null baseline. In one instance, the analytics server 106 may obtain pre-period and post-period by calculating regular sales of the item in the category for a given period before and during the promotion period where the regular sales refer to sales of a given sale item without any sales promotions for the given item. In other words, the regular sales for the item during non-promotional period of items is equal to the actual sales of the item. In one example, the analytics server 106 calculates (or generates an instruction to receive) actual sales for the item the week before and the week after the week of the promotion. The analytics server 106 also calculates (or generates an instruction to receive) sales for the item during the week of the promotion. In another example, the analytics server 106 calculates actual sales for the item for a number of weeks before, and a number of weeks after the week of the promotion period. Upon the calculation of the pre-period and the post-period, the analytics server 106 calculates the control strategy lift value using the determined pre-period and post-period sales value as inputs in a lift model. In one example, the lift model run by the analytics server 106 predicts the lift in sales of the item that has been caused by a product promotion obtained by correlation of past sales performance. In another example, the lift model run by the analytics server 106 predicts the lift in sales of the item that has been caused by a product promotion obtained by correlation of past sales performance in light of current promotions, or by any other suitable technique.

In another embodiment, the analytics server 106 may use a lift model to calculate the control strategy lift value, where the lift model predicts the lift in sales of an item or the increase in sales for a related item category. For instance, the analytics server 106 may use a lift model that correlates regular sales of each item in a category to one another to determine a correlation value of each item to each other item in the category. The correlation value may represent the numerical similarity between the estimated regular sales of two or more items sold by a business merchant.

In an embodiment, the analytics server 106 may randomly select a null test location. In an embodiment, the null test location is randomly selected, by the analytics server 106, not based on the control location. For example, if the control location was Boston, then the null test location is randomly selected by the analytics server 106 from a group of one or more locations of a business merchant that does not include Boston. The analytics server 106 may employ one or more algorithms that are configured to randomly select the null test location from the group of one or more locations. The analytics server 106 may also randomly select a null time period for a sale of a given item. In an embodiment, the null time period may be randomly selected by the analytics server 106 and is not based on the pre-period or the post-period. The analytics server 106 may employ one or more algorithms that are configured to randomly select the null time period that is not based on the pre-period or the post-period. The analytics server 106 may also randomly select a null item not associated with the item. For example, if the item was blazers, then the null item is randomly selected by the analytics server 106 from a group of one or more other items of a business merchant that does not include blazers. The analytics server 106 may employ one or more algorithms that are configured to randomly select the null item from the group of one or more other items that does not include the item.

The analytics server 106 iteratively calculates a plurality of null lift values using the randomly selected null time period, the randomly selected null test location, the randomly selected null item, and a plurality of null baselines. In an embodiment, a plurality of null baseline algorithms may be employed by the analytics server 106 in order to determine the plurality of null baselines for the null item(s). For instance, the plurality of null baselines may correspond to one or more of the null test location's prior year's sales value, prior week's sales value, and prior week's category share value. It is to be noted that any other suitable algorithm to calculate baseline known in the art may be employed in order to calculate the plurality of null baselines for the randomly selected null item(s) without departing from the scope of the disclosed embodiments. The plurality of null lift values may be iteratively calculated by the analytics server 106 by entering values of the randomly selected null time period, the randomly selected null test location, the ran-domly selected null item, and at least one of the plurality of null baselines into a computer program that executes a lift model.

In some embodiments, the analytics server 106 may calculate the plurality of null lift values individually for each of the plurality of null baselines. For example, if there are 50 null baselines values, the analytics server 106 calculates the null lift values for each of the 50 null baseline values using the randomly selected null time period, the randomly selected null test location, the randomly selected null item by entering values of the randomly selected null time period, and each of the plurality of null baselines at a time into a computer program having a sequel code (SQL) that runs a lift model algorithm.

In some embodiments, the analytics server 106 may randomly select a new null test location, a new null item, a new null time period for a sale of a new null item, and a plurality of new null baselines that may correspond to one or more of the new null test location's prior year's sales value, prior week's sales value, and prior week's category share value. The plurality of null lift values are iteratively calculated by the analytics server 106 by inputting values of the randomly selected new null time period, the randomly selected new null test location, the randomly selected new null item, and at least one of the plurality of new null baselines into a computer program that runs a lift model for the items of concern. The analytics server 106 may continue to select a new null test location, a new null item, a new null time period for a sale of a new null item, and a plurality of new null baselines for a pre-defined number of times. The analytics server 106 may calculate a plurality of new null lift values individually for each of the new plurality of null baselines for the pre-defined number of times. In other words, the calculation of the plurality of null lift values may be iterated, by the analytics server 106, over and over with different null items randomly selected using the same or different selection criteria and different test promotions (null time periods and null locations) in order to validate one or more of the plurality of null baselines algorithms result(s) prior to the selection of the optimal null baseline algorithm from the plurality of null baselines algorithms. In this manner, the false positive lifts may be reduced.

The analytics server 106 determines a likelihood for a false positive lift for each of the determined plurality of null lift values. The likelihood for a false positive lift corresponds to the plurality of null lift values. In an embodiment, the analytics server 106 may generate a lift chart to determine accuracy for each of the determined plurality of null lift values that predict continuous matching null lift values data. The lift chart may include one or more statistical data such as perchance of null lift value, standard deviation, etc., in order for analytics server 106 to determine the likelihood for a false positive lift for each of the determined plurality of null lift values that predict continuous matching null lift values data.

The analytics server 106 generates an instruction to the user interface to display the processed plurality of null lift values and the corresponding likelihood for a false positive lift. Upon receiving the instructions from the analytics server 106, the user interface displays the plurality of null lift values and the corresponding likelihood for a false positive lift where the optimal baseline algorithm can be determined by comparisons between lift charts. The analytics server 106 selects an optimal null baseline algorithm from the plurality of null baseline algorithms that has a corresponding lift distribution centered around zero.

Figure 2:
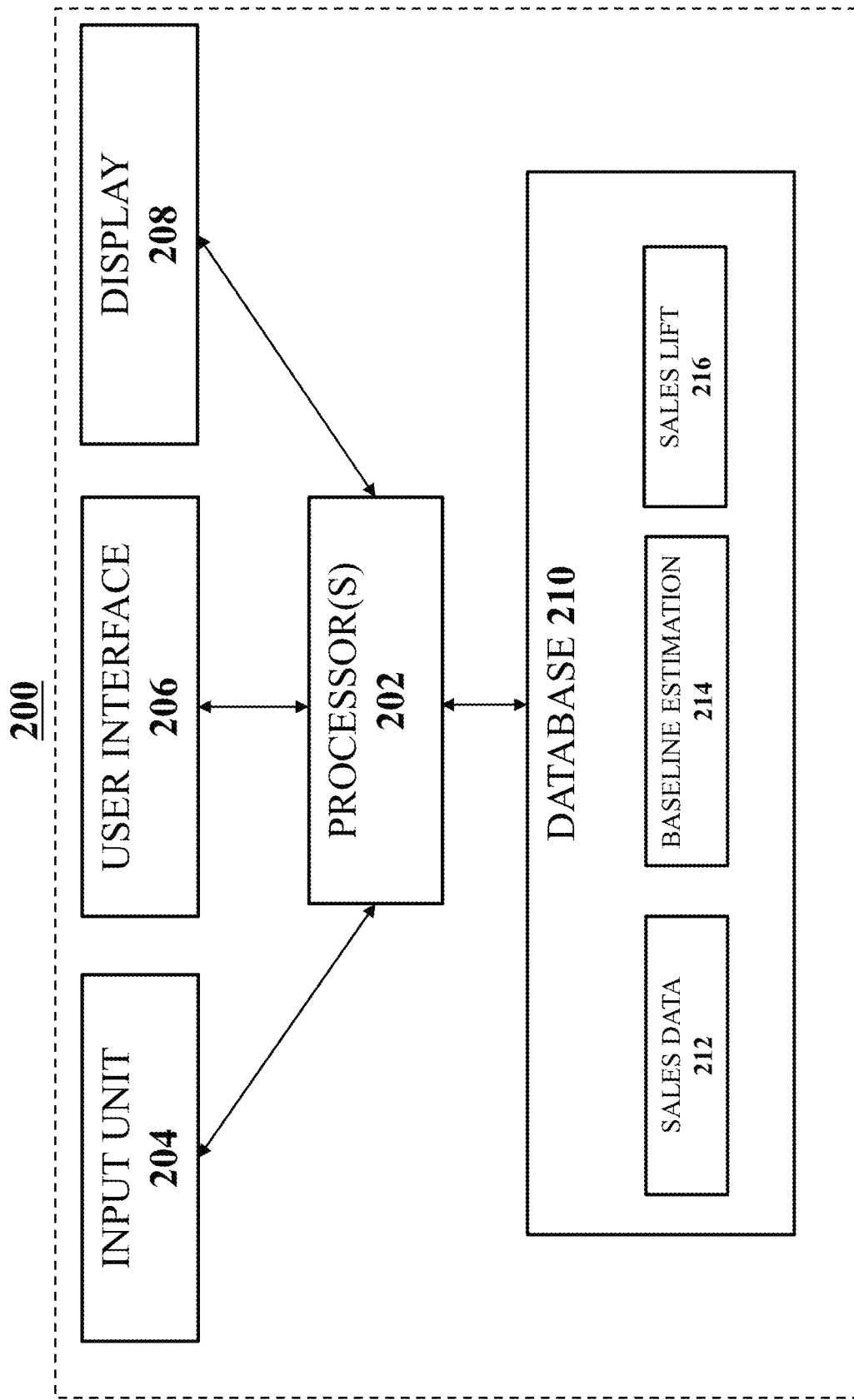
FIG. 2 is a block diagram showing components of an exemplary system to determine an optimal baseline algorithm for calculating sales lift, according to an exemplary embodiment.

FIG. 2 is a block diagram showing components of an exemplary system 200 to determine optimal baseline algorithm for calculating sales lift, according to an exemplary embodiment. The exemplary system 200 comprises one or more processors 202, an input unit 204, a user interface 204, a display 208, and database 210. In one implementation, all the components of the system 200 may be connected via an interconnect bus. In another implementation, the one or more processors 202 may be connected to a memory device via a local microprocessor bus, and the remaining components of the system 200 may be connected via one or more input/output buses.

One or more processors 202 control the operations of the system 200. In one embodiment, a single processor may be employed. In another embodiment, a plurality of processors 202 may be employed for configuring the system 200 as a multi-processor system. The processor 202 includes suitable logic, circuitry, and interfaces that are operable to execute one or more instructions to perform predetermined operations such as calculating a baseline and a sales life for the businesses. The processor 202 can be realized through a number of processor technologies known in the art. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor 202 may also include a Graphics Processing Unit (GPU) that executes the set of instructions to perform one or more processing operations.

The input unit 204 may be a keyboard, mouse, pointer, or other input generating device to facilitate input of control instructions by the circuit designer to the processor 202. In one embodiment, the input unit 204 provides a portion of the user interface 206 for the system 200, and may include an alphanumeric keypad for inputting alphanumeric and other key information along with a cursor control device such as a mouse, a trackpad or stylus. A display 208 of the system 200 may include a cathode ray tube (CRT) display, liquid crystal display (LCD), plasma, or light emitting diode (LED) display. In some examples, the display 208 provides some or all of the functionality of a user interface 206 of computing device. For instance, the display 208 can be a touch-sensitive and/or presence-sensitive display that can display a graphical user interface (GUI) and detect input from a user in the form of user input gestures using capacitive or inductive detection at or near the presence-sensitive display. A graphics subsystem may receive textual and graphical information and process the information for output to the display 208.

The user interface 206 allows a user of computing device to interact with computing device. Examples of user interface 206 include, but are not limited to, a keypad embedded on computing device, a keyboard, a mouse, a roller ball, buttons, or other devices that allow a user to interact with computing device. In some examples, computing device does not include user interface 206, and the user interacts with computing device with the display 208 (e.g., by providing various user gestures). In some examples, the user interacts with computing device with the user interface 206 and the display 208.

A memory unit (not shown) may be provided in the system 200. The memory may be a non-volatile storage device for storing data and instructions, to be used by the processor 202. The memory may be implemented with a magnetic disk drive, an optical disk drive, a solid state device, or an attachment to a network storage. The memory may comprise one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. The memory may include one or more instructions that are executable by the processor 202 to perform specific operations.

The database 210 can be configured to store information within computing device during operation. The database 210 in some examples, is described as a computer-readable storage medium. In some examples, the database 210 include a temporary memory for not long-term storage of the data. The database 210 in some examples, described as a volatile memory, meaning that database 210 do not maintain stored contents when the computer is turned off. Examples of volatile memories include random access memories (RAM), dynamic random access memories (DRAM), static random access memories (SRAM), and other forms of volatile memories known in the art. In some examples, database 210 is used to store program instructions for execution by one or more processors 202. The database 210, for example, is used by software or applications running on merchant devices to temporarily store information during program execution.

The database 210 may include one or more computer-readable storage media. The database 210 can further be configured to store larger amounts of information for long-term storage of information. In some examples, the database 210 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

The database 210 may be further configured to include one or more sub-databases such a sales data database 212, baseline estimation data database 214, and sales lift data database 216. The sales data database 212 is configured to receive sales data corresponding to sales of items at a number of different locations of a business merchant from the merchant devices. The processor 202 may be configured to request and retrieve sales data from the sales data database 212. The processor 202 may be configured to calculate baseline sales for a target item of a business merchant during a time period that includes one or more sales promotion. In one example, the processor 202 uses a weighted sum of estimated regular sales for the target item with similar sales trends to the target item to estimate the baseline sales of the target item during a time period including one or more promotions. The processor 202 may store the determined baseline for the target item in the baseline estimation data database 214. The processor 202 may be configured to calculate the sales lift for a target item that is attributable to one or more sales promotions associated with the target item based at least in part on the estimated baseline sales for the target item. The processor 202 may the store the determined lift for the target item in the sales lift data database 216.

In the illustrated embodiment, the sales data database 212, the baseline estimation data database 214, and the sales lift data database 216 are shown as separate components. However, in an alternate embodiment, the sales data database 212, the baseline estimation data database 214, and the sales lift data database 216 can be a single database, and are formed in a common database hardware unit. In general, the sub-databases of the database 210 are presented separately for ease of description and illustration. However, such illustration and description should not be construed to imply that these sub-databases of the database 210 are necessarily separately implemented, but can be in some examples since a wide variety of other logical and physical arrangements are possible in order to implement the functionality attributed to the example of the database 210.

Figure 3:
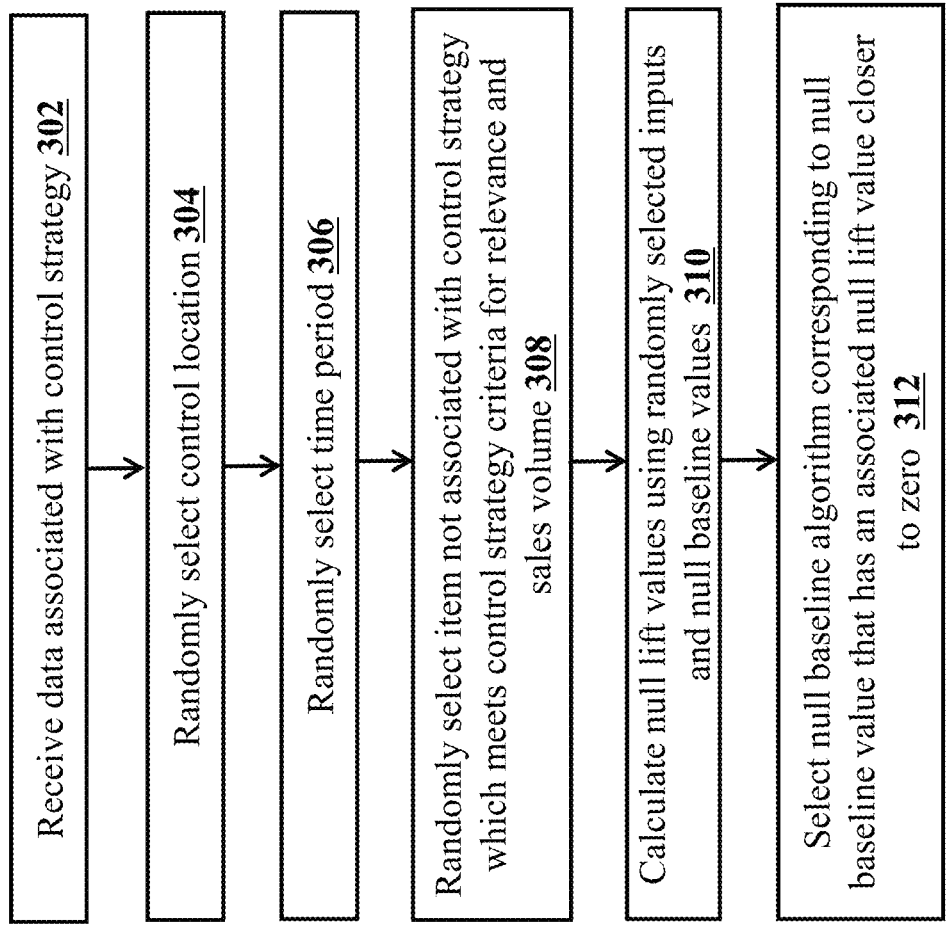
FIG. 3 shows a flow diagram illustrating a method to determine an optimal baseline algorithm for calculating sales lift, according to an exemplary embodiment.

FIG. 3 shows a flow diagram illustrating a method 300 to determine optimal baseline algorithm for calculating sales lift, according to an exemplary embodiment.

At step 302, an analytics server may receive data associated with a control strategy. In an embodiment, the analytics server receives from database an input from an user interface comprising data associated with a control location. The data associated with the control location is stored into one or more data records, and the data records are stored in the database. In another embodiment, the analytics server may query the database to obtain data associated with the control location from an appropriate data record in a list of data records stored in the database. The control location may be any given location in one or more locations of a business merchant. For instance, the control location may be a location of a store of a business merchant.

The data associated with the control location may include data associated with a control strategy. The control strategy may include a pre-period, a post-period, and an item associated with the control strategy. For example, the analytics server may obtain sales data stored on the data record from the database for a given sale item (e.g., a shirt) at a control location (e.g., Boston store) for a one month period before the promotional offer provided on the given shirt (pre-period) and for a one month period during the promotional offer is provided on the given shirt (post-period). In an alternate embodiment, the post-period for which the sales data is retrieved by the analytics server may not include any promotion.

At step 304, the analytics server may randomly select a null location. In an embodiment, the analytics server randomly selects a null test location where the null test location is not based on the control location. For example, if the control location was Washington, then the null test location is randomly selected by the analytics server from a group of one or more locations of a business merchant that does not include Washington. The analytics server may employ one or more algorithms that are configured to randomly select the null test location from the group of one or more locations.

At step 306, the analytics server may randomly select a null time period. In an embodiment, the analytics server randomly selects a null time period for a sale of a null item where the null time period is not based on the pre-period or the post-period. The analytics server may employ one or more algorithms that are configured to randomly select the null time period that is not based on the pre-period or the post-period.

At step 308, the analytics server may randomly select a null item not associated with the control strategy which meets the control strategy criteria for relevance and sales volume. For example, if the item was shirts, then the null item is randomly selected by the analytics server from a group of one or more other items of a business merchant that does not include shirts. The analytics server may employ one or more algorithms that are configured to randomly select the null item from the group of one or more other items that does not include the item that meets the control strategy criteria for relevance and sales volume. Additionally or alternatively, the analytics server may randomly select a null item from a plurality of items associated with a second category of item. The second category of items is associated with the category associated with the item and the sales volume associated with the item.

At step 310, the analytics server may evaluate lift for each baseline algorithm. In an embodiment, the analytics server iteratively calculates a plurality of null lift values using the randomly selected null time period, the randomly selected null test location, the randomly selected null item, and a plurality of null baselines determined by a plurality of null baseline algorithms. The plurality of null baselines correspond to at least one of the null test location's prior year's sales value, prior week's sales value, and prior week's category share value. It is to be noted that any other suitable null baseline algorithms may be utilized to calculate baseline known in the art may be employed in order to calculate the plurality of null baselines for the randomly selected null item(s) without moving out from the scope of the disclosed embodiments. The plurality of null lift values may be iteratively calculated by the analytics server by entering values of the randomly selected null time period, the randomly selected null test location, the randomly selected null item, and at least one of the plurality of null baselines into a computer program that runs a lift model for the items of concern. Upon the calculation of the plurality of null baselines, the analytics server may rank the plurality of null baseline algorithms corresponding to the plurality of null lift values. The rank of the plurality of null baseline algorithms may be associated with each of the plurality of null baseline algorithms being adjusted upward when the corresponding null lift value for each of the plurality of null baselines is closer to zero.

In an embodiment, the analytics server may calculate the plurality of null lift values individually for each of the plurality of null baselines. Alternatively and/or additionally, the calculation of the plurality of null lift values, by the analytics server, may be iterated over and over with different null items randomly selected using the same or different selection criteria and different test promotions (null time periods and null locations) in order to validate one or more of the plurality of null baseline algorithms analysis result(s) prior to the selection of the optimal null baseline algorithm.

At step 312, the analytics server selects null baseline algorithm from the plurality of null baseline algorithms. In one embodiment, the analytics server selects an optimal null baseline algorithm from the plurality of null baseline algorithms that has an associated null lift value close to zero. The optimal null baseline algorithm from the plurality of null baseline algorithms may be determined based on the ranking of each of the plurality of null baselines algorithms which is associated with the corresponding null lift value. The analytics server may then execute the optimal null base algorithm to calculate an optimal control strategy lift value based on the pre-period, the post-period, the item associated with the control strategy, and the highest ranked optimal null baseline algorithm.

In another embodiment, the analytics server may calculate likelihood of false reading of a positive lift for each null baseline algorithm. In an embodiment, the analytics server determines a likelihood for a false positive lift for each of the determined plurality of null lift values. Alternatively and/or additionally, the analytics server may generate a lift chart to determine accuracy for each of the determined plurality of null lift values that predict continuous matching null lift values data. The lift chart may include one or more statistical data, such as standard deviation, in order for the analytics server to determine the likelihood for a false positive lift for each of the determined plurality of null lift values that predict continuous matching null lift values data.

The analytics server generates an instruction to the user interface to display the processed plurality of null lift values and the corresponding likelihood for a false positive lift, and upon the display of the plurality of null lift values and the corresponding likelihood for a false positive lift, the optimal baseline algorithm can be determined by comparisons between lift charts. In another embodiment, the analytics server may use an artificial neural network (ANN) for processing and storage. The ANN is an electronic model that can use many processors and can learn from experience. The ANN has a plurality of neural network nodes, and each neural network node can receive an input and transmit an output to another neural network node, which then responds when it receives an input. The neural network nodes are trained by adjusting weightings based upon each output. Examples of neural network systems can be found in Laurene Fausett's Fundamentals of Neural Networks Architectures, Algorithms and Applications, published by Pearson Education in 2004, which is incorporated by reference. The analytics server may generate an instruction to update the processed plurality of null lift values in the ANN so that the neural network nodes can determine a likelihood for false positive lift for each of the plurality of null lift values. The analytics server can then transmit this value.

Figure 4:
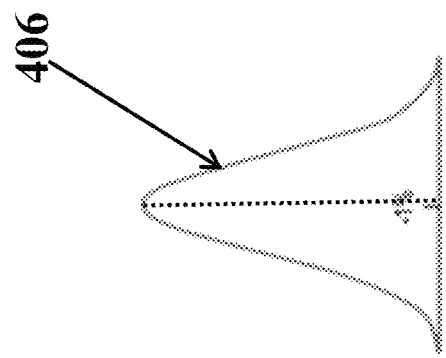
FIG. 4 shows a graph depicting a distribution of lift corresponding to different baseline algorithms, according to an exemplary embodiment.
Figure 4:
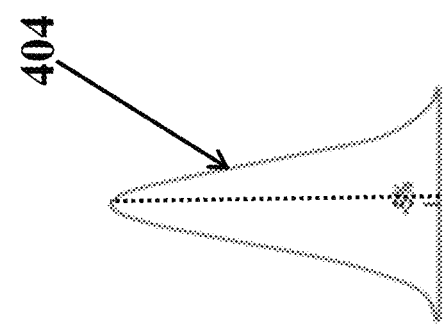
Figure 4:
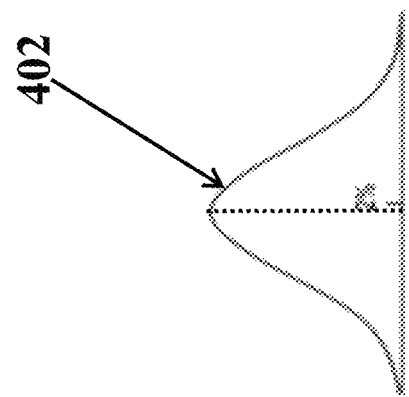

FIG. 4 shows graphs 400 depicting a distribution of lift corresponding to different baseline algorithms, according to an exemplary embodiment. In some embodiments, an analytics server calculates a plurality of null lift values using a randomly selected null time period, a randomly selected null test location, a randomly selected null item, and a plurality of null baselines determined based on a plurality of null baseline algorithms. In order to obtain an optimal null baseline algorithm, the analytics server determines an average of each of the calculated plurality of null lift values for each of the plurality of baselines. Alternatively and/or additionally, the analytics server may further determine an average value for the determined likelihood for false positive lift for each of the different null baseline algorithms. The analytics server may determine an optimal null baseline algorithm by calculating an average of each of the calculated plurality of null lift values for each of the plurality of null baseline algorithms, but excluding the null lift values for the baselines that have a false positive lift from the plurality of null lift values in order to calculate the average.

As illustrated in FIG. 4, a graph 402 represents distribution of lift value for a first baseline value determined by a first baseline algorithm. A graph 404 represents distribution of lift value for a second baseline value determined by a second baseline algorithm. In order to determine an optimal baseline algorithm, the analytics server determines an average of each of the calculated lift values for the first baseline algorithm and the second baseline algorithm as shown in the graph 406.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:

receiving, by an analytics server executing an artificial intelligence computer model having a plurality of neural network nodes, an input from a user interface comprising data associated with a control location, wherein the data associated with the control location comprises data associated with a control strategy comprising a pre-period, a post-period, and an item associated with the control strategy, wherein the post-period corresponds to a time-period during a first promotion period;

randomly selecting, by the analytics server, a null test location, wherein the null test location is selected from a group of one or more locations not including the control location;

randomly selecting, by the analytics server, a null time period, wherein the null time period is not based on the pre-period or the post-period;

generating and transmitting, by the analytics server, a first instruction to a database to receive data associated with the item;

upon transmitting the first instruction, receiving, by the analytics server and from the database, data associated with a plurality of items of a first item category of the item, the data associated with the plurality of items of the first item category of the item comprising sales data from the first promotion period;

identifying, by the analytics server, a second item category responsive to determining a plurality of items of the second item category satisfies a criteria for relevance and sales volume compared to the plurality of items of the first item category, the analytics server determining the plurality of items of the second item category satisfies the criteria for sales volume by comparing the sales data from the first promotion period with sales data of the plurality of items of the second item category of a second post-period corresponding to a second time period during a second promotion period;

randomly selecting, by the analytics server, a null item from the plurality of items of the second item category, the plurality of items of the second item category not including the item;

iteratively executing, by the analytics server, each neural network node to calculate a plurality of null lift values using the randomly selected null time period, the randomly selected null test location, the randomly selected null item, and a plurality of null baselines determined based on a plurality of null baseline algorithms;

wherein with each iteration the analytics server trains the artificial intelligence computer model by adjusting a weight of one or more neural network nodes associated with at least one of the randomly selected null time period, the randomly selected null test location, or the randomly selected null item;

identifying, by the analytics server, a first subset of null baseline algorithms where each null baseline algorithm within the first subset of null baseline algorithms does not have a false positive lift based on the plurality of null lift values corresponding to the plurality of null baseline algorithms;

selecting, by the analytics server, an optimal null baseline algorithm from the first subset of null baseline algorithms based on a rank of each null baseline algorithm within the first subset of null baseline algorithms, the rank of each null baseline algorithm based upon a corresponding null lift value, wherein the rank associated with each of the first subset of null baselines algorithms is adjusted upward when the corresponding null lift value is closer to 0;

executing, by the analytics server the selected null baseline algorithm configured to calculate an optimal control strategy lift value based on the pre-period, the post-period, and the item associated with the control strategy; and generating and executing, by the analytics server, a second instruction causing display of the optimal control strategy lift value on the user interface.

2. The computer-implemented method of claim 1, wherein the plurality of null baseline algorithms corresponds to at least one of the null test location's prior year's sales value, prior week's sales value, and prior week's category share vale.

3. The computer-implemented method of claim 1, wherein the plurality of null baseline algorithms corresponds to a sales value corresponding to a random time.

4. The computer-implemented method of claim 1, further comprising:

determining by the analytics server, a likelihood for the false positive lift corresponding to each of plurality of null lift values, and generating, by the analytics server, the second instruction to the user interface to display the plurality of null lift values and the corresponding likelihood for a false positive.

5. The computer-implemented method of claim 1, further comprising determining, by the analytics server, an average value for the likelihood for the false positive lift corresponding to each of the plurality of null baseline algorithms.

6. The computer-implemented method of claim 1, wherein the category share value is based on sales associated with a category of an item in relation to an overall sales associated with the control location.

7. The computer-implemented method of claim 1, wherein the pre-period corresponds to a time-period leading up to a beginning of a promotional period.

8. The computer-implemented method of claim 1, wherein the post-period corresponds to a time-period during a promotion period.

9. A computer system comprising:

an analytics server comprising one or more processors to execute an artificial intelligence computer model having a plurality of neural network nodes, the analytics server configured to:

receive an input from a user interface comprising data associated with a control location, wherein the data associated with the control location comprises data associated with a control strategy comprising a pre-period, a post-period, and an item associated with the control strategy;

randomly select a null test location, wherein the null test location is selected from a group of one or more locations not including the control location;

randomly select a null time period, wherein the null time period is not based on the pre-period or the post-period, wherein the post-period corresponds to a time-period during a promotion period;

generate and transmit a first instruction to a database to receive data associated with the item;

upon transmitting the first instruction, receive from the database, data associated with a first plurality of items of a first item category of the item, the data associated with the plurality of items of the first item category of the item comprising sales data from the first promotion period;

identify a second item category responsive to determining a second plurality of items of the second item category satisfies a criteria for relevance and sales volume compared to the first plurality of items of the first item category, the analytics server determining the plurality of items of the second item category satisfies the criteria for sales volume by comparing the sales data from the first promotion period with sales data of the plurality of items of the second item category of a second post-period corresponding to a second time period during a second promotion period;

randomly select a null item from the second plurality of items of the second item category, the second plurality of items not including the item;

iteratively execute each neural network node to calculate a plurality of null lift values using the randomly selected null time period, the randomly selected null test location, the randomly selected null item, and a plurality of null baselines determined based on a plurality of null baseline algorithms, wherein with each iteration the analytics server trains the artificial intelligence computer model by adjusting a weight of one or more neural network nodes associated with at least one of the randomly selected null time period, the randomly selected null test location, or the randomly selected null item;

identify a first subset of null baseline algorithms where each null baseline algorithm within the first subset of null baseline algorithms does not have a false positive lift based on the plurality of null lift values corresponding to the plurality of null baseline algorithms;

select an optimal null baseline algorithm from the first subset of null baseline algorithms based on a rank of each null baseline algorithm within the first subset of null baseline algorithms, the rank of each null baseline algorithm based upon a corresponding null lift value, wherein the rank associated with each of the first subset of null baselines algorithms is adjusted upward when the corresponding null lift value is closer to 0;

execute an analytical protocol using the selected null baseline algorithm configured to calculate an optimal control strategy lift value based on the pre-period, the post-period, the item associated with the control strategy, and a time period of the selected null baseline algorithm; and generate and execute a second instruction to display the optimal control strategy lift value on the user interface.

10. The computer system of claim 9, wherein the plurality of null baseline algorithms corresponds to at least one of the null test location's prior year's sales value, prior week's sales value, and prior week's category share vale.

11. The computer system of claim 9, wherein the plurality of null baseline algorithms corresponds to a sales value corresponding to a random time.

12. The computer system of claim 9, wherein the analytics server is further configured to:
determine a likelihood for the false positive lift corresponding to each of plurality of null lift values, and
generate the second instruction to the user interface to display the plurality of null lift values and the corresponding likelihood for a false positive.

13. The computer system of claim 12, wherein the analytics server is further configured to determine an average value for the likelihood for the false positive lift corresponding to each of the plurality of null baseline algorithms.

14. The computer system of claim 9, wherein the pre-period corresponds to a time-period leading up to a beginning of a promotional period.

* * * * *